Jan. 31, 1928.
O. E. SEIFFERT
1,658,009
SHEET METAL SPOOL
Filed May 10, 1926
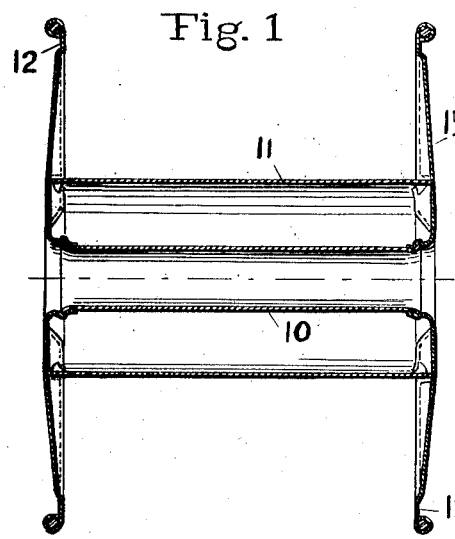
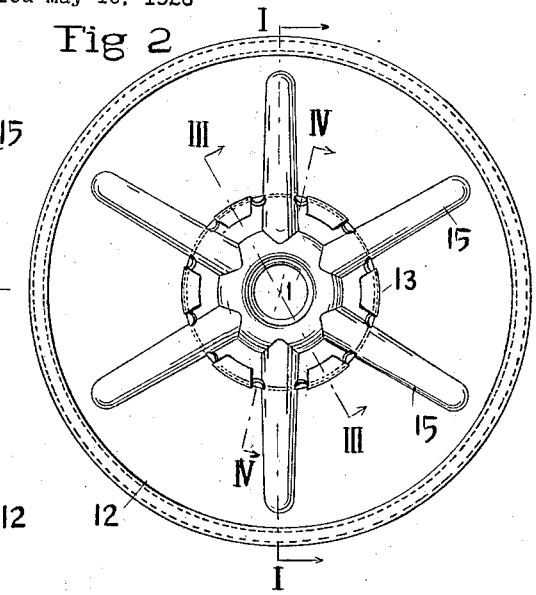
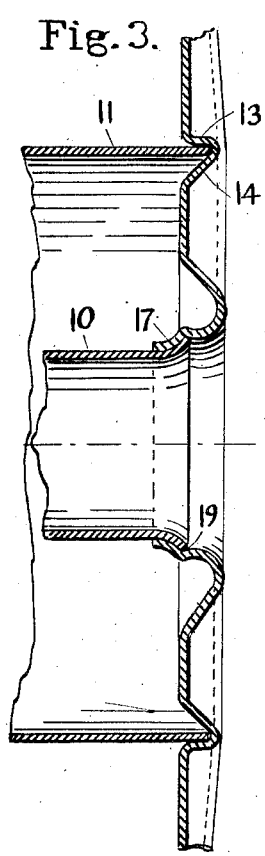
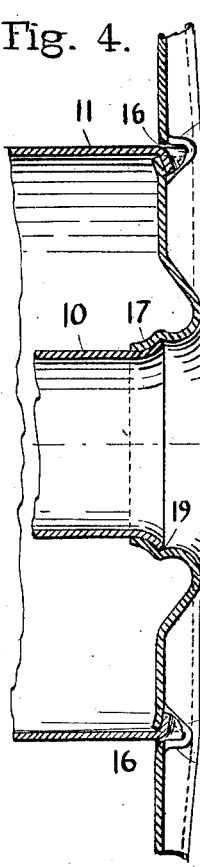
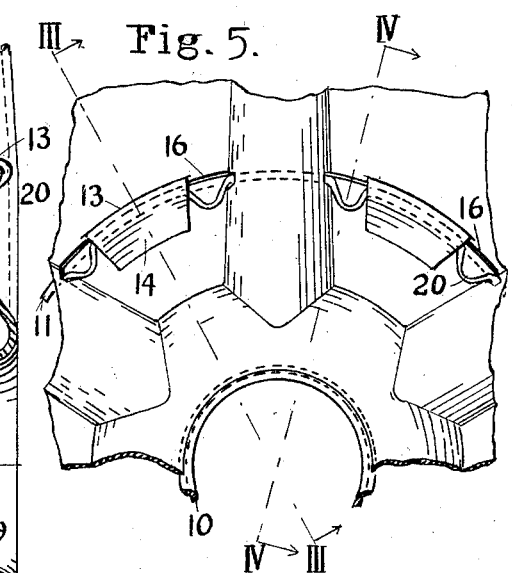
Inventor,
Otto E. Seiffert,
By Samuel W. Balch
Attorney Patented Jan. 31, 1928.

1,658,009

UNITED STATES PATENT OFFICE.

OTTO E. SEIFFERT, OF IRVINGTON, NEW JERSEY, ASSIGNOR TO CROCKER-WHEELER ELECTRIC MANUFACTURING COMPANY, OF AMPERE, NEW JERSEY, A CORPORATION OF NEW JERSEY.

SHEET-METAL SPOOL.

Application filed May 10, 1926. Serial No. 107,954.

This invention relates to a spool of sheet metal suitable for holding wire, and the object is to provide a spool for such use of substantial construction, suitable for inexpensive quantity production from pressed steel or other ductile stock, and free from sharp edges at any points accessible in handling.

In the accompanying sheet of drawings which forms a part of this specification

Figure 1 is a section through a spool of pressed steel which embodies this invention taken on the line I—I of Fig. 2.

Fig. 2 is an end view of the same.

Fig. 3 is a section on the line III—III of Figs. 2 and 5, drawn to a larger scale.

Fig. 4 is a section on the line IV—IV of Figs. 2 and 5, drawn to the larger scale.

Fig. 5 is an end view of a portion adjacent to the center drawn to the larger scale.

The spool comprises a hub member 10 which may be a seamless tube, and a concentric tubular body 11 which may be formed by bending a rectangular piece of sheet metal into a cylinder having all its elements of uniform length with the ends of the sheet abutting and not necessarily joined. The edges of the sheet which are to form the ends of the cylinder may be straight and free from projections. Circular sheet metal heads 12, 12, each have a circumferential groove pressed therein which is preferably intermittent to form a series of arcs each with an outer wall 13 perpendicular to the face of the head and an inclined inner wall 14. Radial stiffening grooves or ribs 15, 15 are also pressed in the head and cross the line of the circumferential groove. The ends of the arcs of the circumferential groove are spaced from the stiffening grooves and through the plane of the sheet between the arcs and the stiffening grooves are perforations 16, 16 which cut into the ends of the arcs and the sides of the stiffening grooves so that a continuous circumferential space is afforded by the arc grooves, perforations and stiffening grooves to receive the end of the tubular body. At the center the head has an inturned flange 17 with an interior circumferential groove 19 within which the end of the hub member is received and flanged or flared outwardly so that the end will engage the interior circumferential groove and firmly hold the two heads properly spaced and against movement to or from each other. The interior circumferential groove is comparatively shallow with respect to the portion of the inturned flange which is outside the end of the hub member so that the tool which is used for flanging the end of the hub member can be withdrawn. It will be seen that the hub member does not have to be as long as the spool. The portions 20, 20 of the ends of the concentric tubular body which project through the perforations in the heads are bent over and hold the heads against the ends of the tubular body.

When a spool of this character is wound with wire the strands may exert considerable pressure against the heads. To resist such pressure and hold the heads from spreading or buckling it is important that the heads should be firmly bound to the ends of the tubular body and also bound to the ends of the hub member so that they cannot approach, and thereby further strengthening the heads.

I claim:—

1. A spool of sheet metal comprising a tubular body having all of its elements of uniform length, a head at each end with an intermittent circumferential groove forming a series of arcs to receive the end of the tubular body and perforations between the arcs through which portions of the end of the tubular body project, the portions of the ends of the tubular body which pass through the perforations being attached to the heads.

2. A spool of sheet metal comprising a tubular body having all of its elements of uniform length, a head at each end with an intermittent circumferential groove forming a series of arcs to receive the end of the tubular body and perforations between the arcs through which portions of the end of the tubular body project, these portions through the perforations being bent over to hold the heads on the ends of the tubular body.

OTTO E. SEIFFERT.